United States Patent [19]

Andersson et al.

[11] Patent Number: 4,716,855
[45] Date of Patent: Jan. 5, 1988

[54] FOOD CONTAINER POT ASSEMBLY

[76] Inventors: Günter Andersson; Uwe D. Holz; Frank J. Margieciok, all of Mannesmannufer 8, 4000 Dusseldorf 1, Fed. Rep. of Germany

[21] Appl. No.: 820,690
[22] Filed: Jan. 21, 1986

[30] Foreign Application Priority Data

Aug. 29, 1985 [DE] Fed. Rep. of Germany ....... 3530853

[51] Int. Cl.⁴ .............................................. A01K 1/10
[52] U.S. Cl. .................................................... 119/61
[58] Field of Search ................................. 119/61, 51.5

[56] References Cited

U.S. PATENT DOCUMENTS

| | | | |
|---|---|---|---|
| 2,813,509 | 11/1957 | Bruno | 119/61 |
| 3,653,362 | 4/1972 | Davis | 119/61 |
| 3,722,476 | 3/1973 | Van Ness et al. | 119/61 |
| 4,128,080 | 12/1978 | Haney | 119/61 |

Primary Examiner—John J. Wilson
Assistant Examiner—Cary E. Stone
Attorney, Agent, or Firm—Toren, McGeady & Associates

[57] ABSTRACT

A food container pot assembly for example for cat or dog food comprises one or a plurality of food container pots, which are closed by a metal foil and which are detachably fixed on a supporting base sheet. The supporting base sheet has a projection for holding a pot and the pot has a surrounding skirt which is a snap fit over the projection to hold the pot in position on the base sheet. The base sheet has a non-slip undersurface which provides the assembly with non-slip qualities and also gives stability and protection against spillage on the surrounding surface on which the food container pot is supported.

6 Claims, 3 Drawing Figures

FOOD CONTAINER POT ASSEMBLY

BACKGROUND OF THE INVENTION

This invention relates to a food container pot or feeding bowl assembly comprising a food container pot or feeding bowl for holding ready prepared food, for domestic animals, such as cats and dogs.

Today, even domestic animals are being fed more and more with ready-prepared foods. This is advantageous particularly when the feeding is to be carried out, for example during the absence of the animal's owner, by neighbours or by children. In particular, the use of already portioned ready-prepared foods offers advantages, because if the food-containing pot or bowl is appropriately marked confusion is unlikely and a correct quantity of food is presented to the animal.

A disadvantage at present is, however, that the prepared food is usually supplied in commercial cans or plastics containers, which usually are unsuitable for use as feeding bowls. This may be due to the limited size of the container opening and/or to lack of stability of the container. A disadvantage common to all containers, not only for prepared foods, is however to be found in their low resistance to slipping on the surface on which they are placed. Since, for example, dogs and cats draw liquid or pasty foods into their mouths with the surfaces of their tongues, the feeding bowls is inevitably displaced during eating step by step over a more or less smooth floor surface in the direction in which the animal is facing. This is accompanied by the risk that a trial of food may be left behind the pot or bowl on the floor or, if the pot or bowl strikes an obstruction, such as the edge of a carpet, it may even tip over.

But even where slip resistance and stability are adequate, the risk exists, particularly with pots or bowls of small opening width, of slobbering and thus unpleasant fouling of the floor in the region of the pot or bowl.

Finally, the eating of food from re-usable feeding pots or bowls is undesirable from hygienic considerations, because the pots or bowls are frequently washed together with crockery of the animal owner or at least rinsed with and in the same cleaning equipment. This entails the risk of a transfer of infection from the animal.

OBJECT OF THE INVENTION

The main object of the present invention is to avoid the aforementioned disadvantages and in particular to provide a food container pot or feeding bowl which permits extremely hygienic use and feeding appropriate to the animal being fed.

SUMMARY OF THE INVENTION

According to the present invention, we provide a food container pot or feeding bowl assembly comprising one or more food container pots or feeding bowls and a supporting base having a pot or bowl holder to which the pot or bowl is adapted to be fitted.

In this way an assembly is obtained having an adequately firm connection between the feeding pot or bowl and the base, the dimensions of which preferably are greater than the sum of the plan areas of a plurality, for example six feeding pots or bowls, so that a base comprising a plurality of feeding pots or bowls can be contained within one sales package.

In order to fix the feeding pot or bowl sufficiently securely on the base, which for example may be rectangular, the feeding pot or bowl may be provided with a bottom recess and the base is then provided with a complementary protrusion, which fits into the recess of the base, thus allowing the feeding pot or bowl to be pushed onto the base. A peripheral skirt having at least two inwardly oriented detent projections or an internal rib may be provided on the pot or bowl and the protrusion may have a peripheral shoulder having at least two complementary depressions or an external groove in which the projections or the rib fit so that a snap connection is obtained between the skirt of the feeding pot or bowl and the shoulder of the protrusion, when the detent projections engage into the depressions or the rib engages in the external groove. The use of an external groove has the advantage that the detent projections of the feeding bowl do not need to be aligned with the localised depressions, but can engage in any rotational position of the pot or bowl into the external groove.

From the point of view of household hygiene, it is particularly advantageous for the feeding pot or bowl and/or the base to be of deep-drawn plastics material, so that they can be thrown away after one use of the feeding bowl and several uses of the base. A particularly suitable plastics material resistant to chewing for the feeding bowl is unplasticised PVC, while the base is preferably of polyester or polystyrene. The base preferably has a slip-resistant, for example roughened, underside.

The feeding pot or bowl, when pre-packed with food is preferably closed with an aluminum foil adhered to its edge.

BRIEF DESCRIPTION OF THE DRAWINGS

An example of an assembly in accordance with the invention is illustrated in the accompanying drawings in which.

DESCRIPTION OF THE PREFERRED EMBODIMENT

Figure 1:
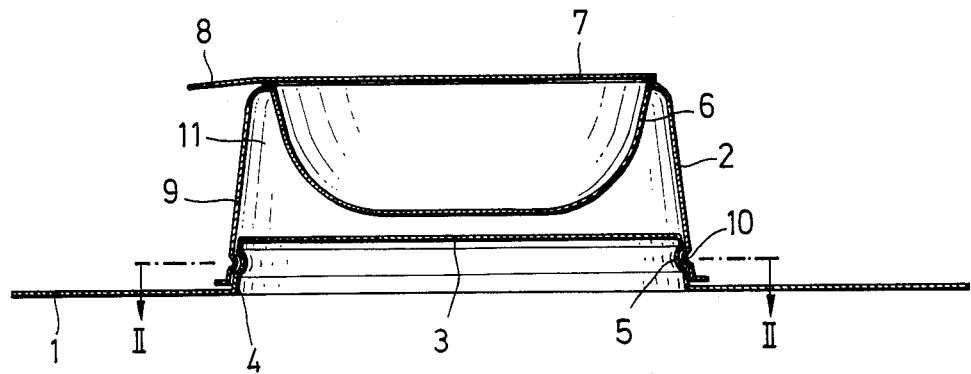
FIG. 1 is a vertical section of the assembly.
Figure 2:
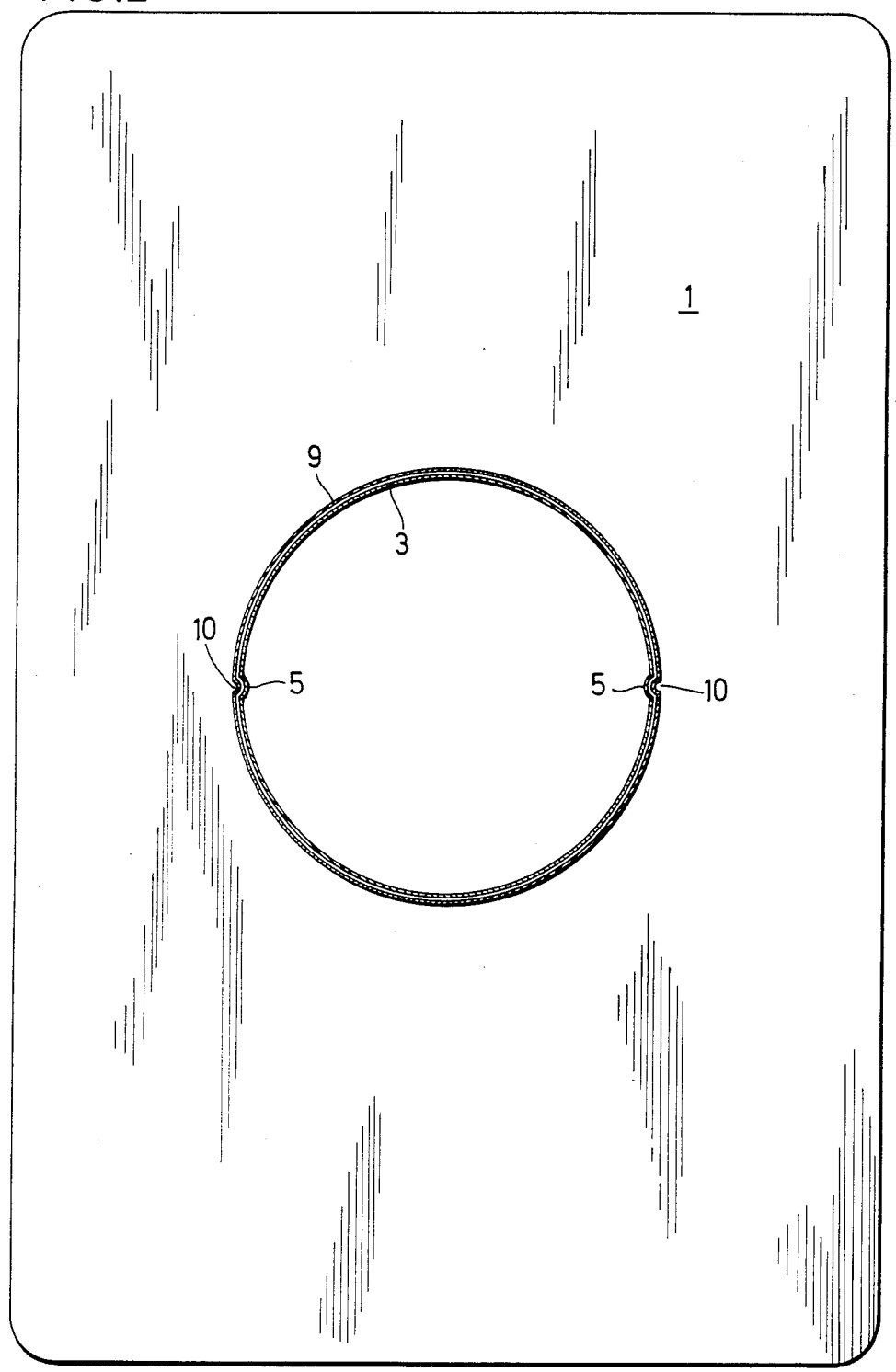
FIG. 2 is a plan view partly in horizontal section along the line II—II in FIG. 1.

The assembly shown in the drawings consists of a rectangular base 1 and a feeding pot 2. Off-centre, the base has a circular protrusion 3, a shoulder 4 of which has at least two outwardly directed spherical depressions 5.

The feeding pot 2 has a bowl 6 which contains food and is closed by a conventional hot-seal foil 7, for example an easily peeled off aluminium foil having a pulling lug 8. A skirt 9 of the feeding bowl 2 has at least two inwardly directed detent projections 10, which engage in the complementary depressions 5 or a circumferential groove, not shown, in the shoulder 4 of the protrusion 3 and thus connect together the bowl and the base sufficiently firmly but also in an easily detachable manner.

Figure 3:
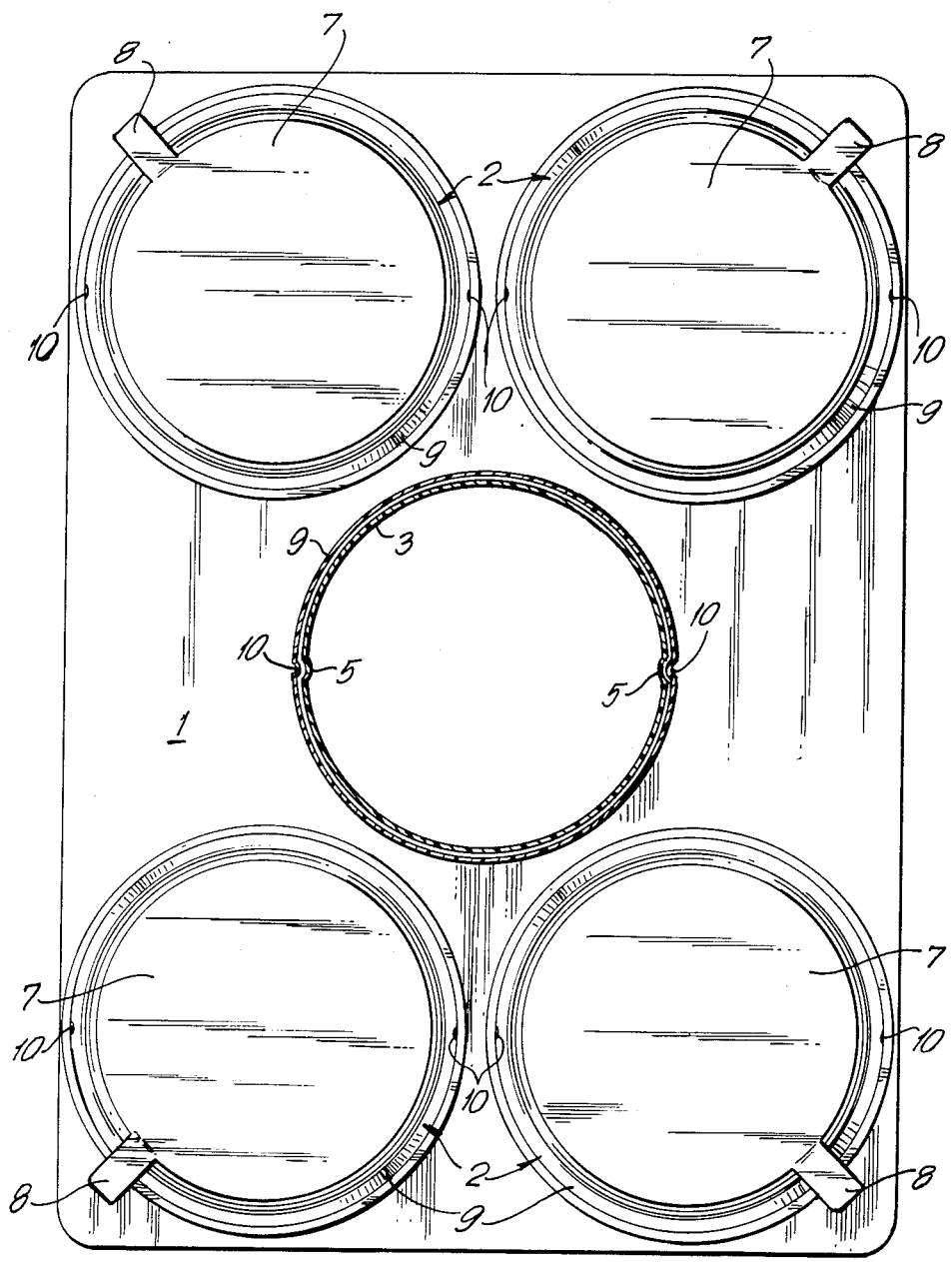
FIG. 3 is a plan view, similar to FIG. 2, of the assembly including a plurality of feeding pots.

A package suitable for sale is obtained if the area about the base 1 surrounding the pot 2 is filled with other food-containing pots, note FIG. 3, and the base, together with the total of, for example, six pots or four feeding pots 2, as shown in FIG. 3 based on the area of the base, is wrapped in a shrink foil. After removal of the shrink foil, the base with one feeding pot 2 pushed onto the protrusion 3 serves for feeding an animal, while the remaining feeding pots for example, are stored in a cool place. After feeding, the emptied feeding pot 2 is pulled off the protrusion 3 and for the next meal a new feeding pot full of food is pushed onto the protrusion. It will be seen that the illustrated example just described has dispoable feeding pots and a base which can be used several times, normally six times.

We claim:

1. In a food container pot assembly comprising at least one food container pot, the improvement comprising a supporting base, said supporting base including pot holder means, said at least one food container pot being fittable to said pot holder means, and said at least one food container pot includes a bottom, means defining a recess in said bottom, an upwardly extending protrusion on said supporting base, said protrusion fitting in said recess of said at least one food container pot, and further comprising depending skirt means extending around said at least one food container pot, said skirt means surrounding said recess, at least two inward projections on said skirt means, shoulder means extending around said protrusion and at least two recess means in said shoulder, said at least two recess means receiving said at least two inward projections.

2. In a food container pot assembly comprising at least one food container pot, the improvement comprising a supporting base, said supporting base including pot holder means, said at least one food container pot being fittable to said pot holder means, said at least one food container pot includes a bottom, means defining a recess in said bottom, an upwardly extending protrusion on said supporting base, said protrusion fitting in said recess of said at least one food container pot, and further comprising depending skirt means extending around said at least one food container pot, said skirt means surrounding said recess, an internal rib in said skirt means, shoulder means extending around said protrusion and means defining an external groove in said shoulder means, said external groove receiving said internal rib.

3. An assembly as claimed in claim 1 or 2, including a plurality of said food container pots, wherein said supporting base has a plan area which is greater than the sum of the plan areas of said plurality of food container pots.

4. An assembly as claimed in claim 1 or 2, further comprising means defining an under-surface of said supporting base and non-slip means on said undersurface.

5. An assembly as claimed in claim 1 or 2, in which at least one of said food container pot and said supporting base is formed of deep-drawn plastics material.

6. An assembly as claimed in claim 1 or 2, in which said food container is made of unplasticised PVC and said supporting base is made of polystyrene.

* * * * *